Nov. 20, 1956 D. H. KELLY ET AL 2,771,055
APPARATUS FOR COATING OPTICAL INTERFERENCE LAYERS
Filed April 25, 1952 9 Sheets-Sheet 8
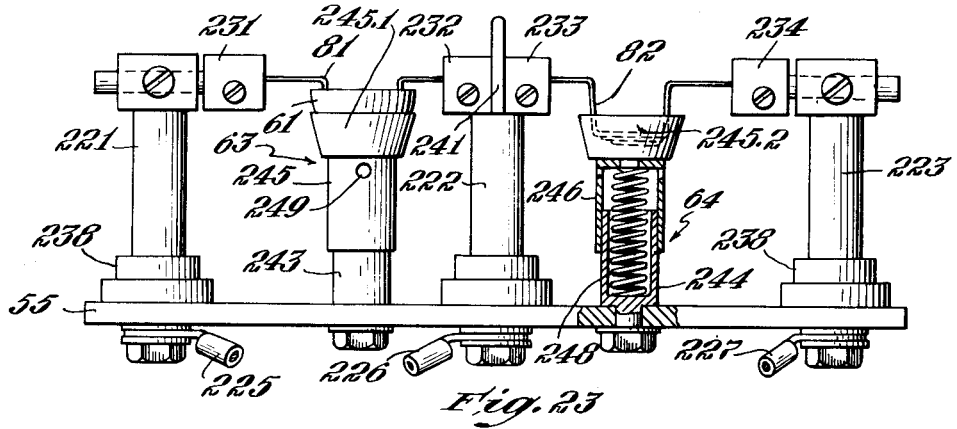
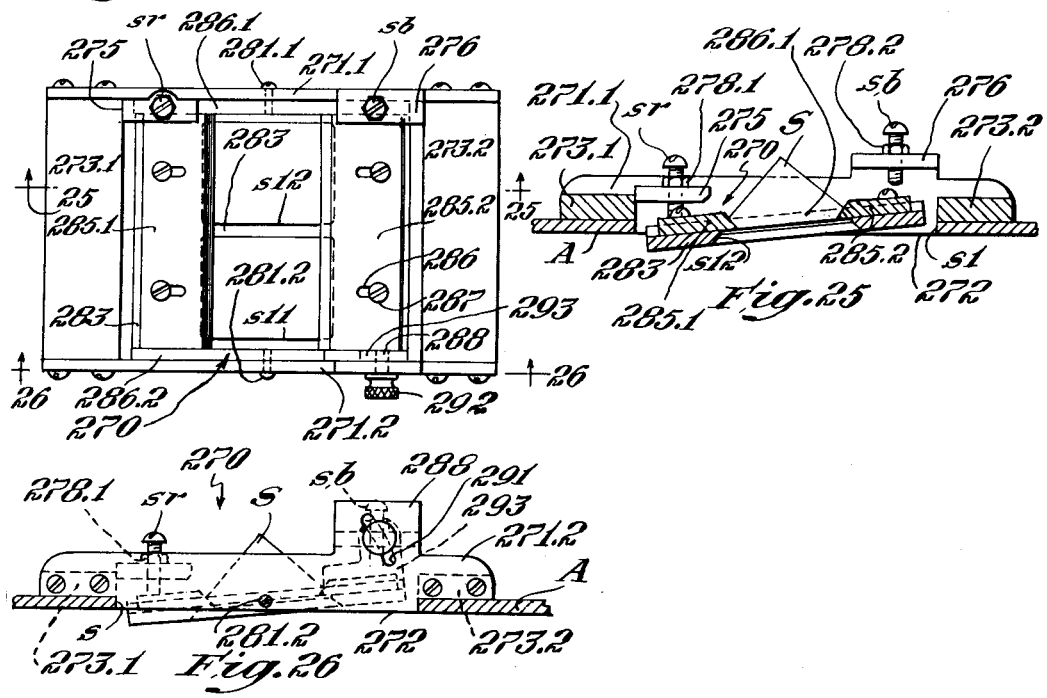
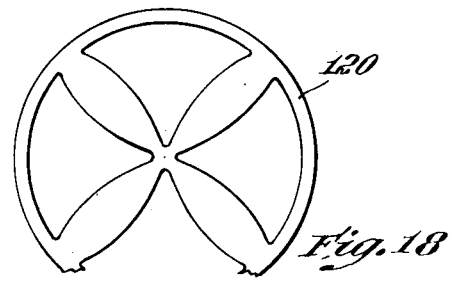
Inventor
Donald H. Kelly
by Roberts, Cushman & Graves
att'ys.

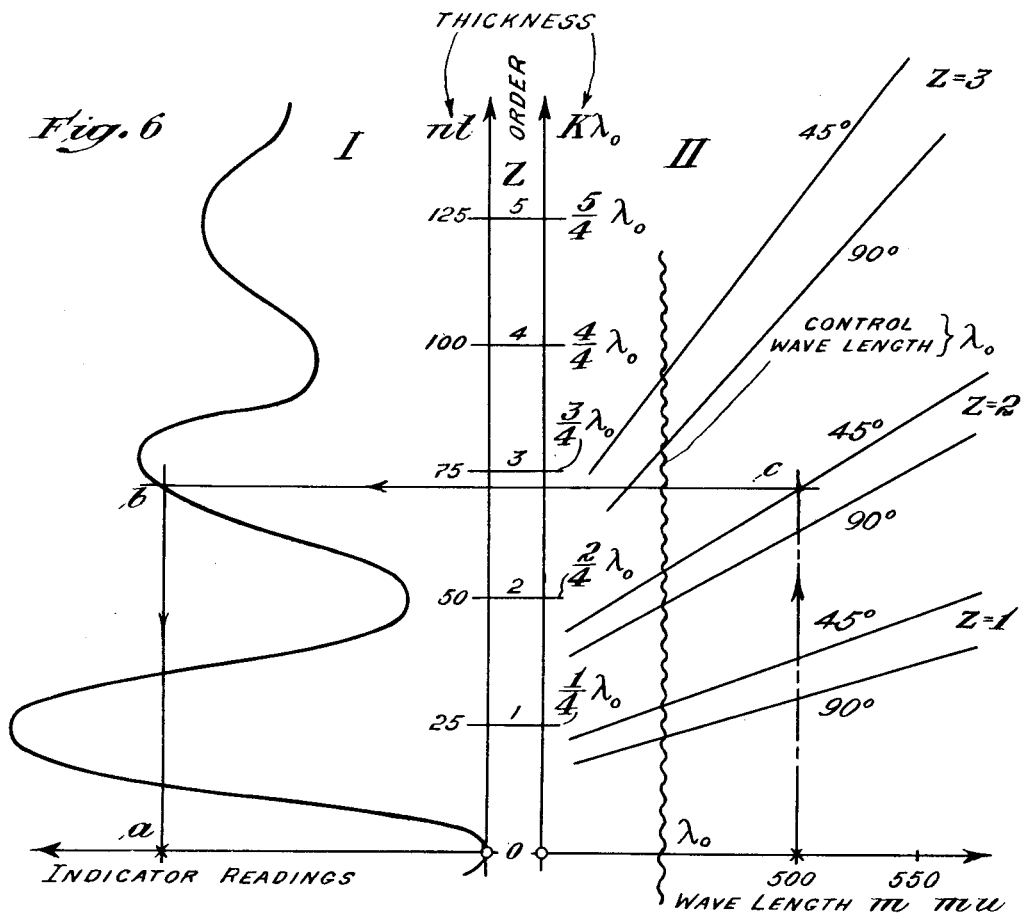
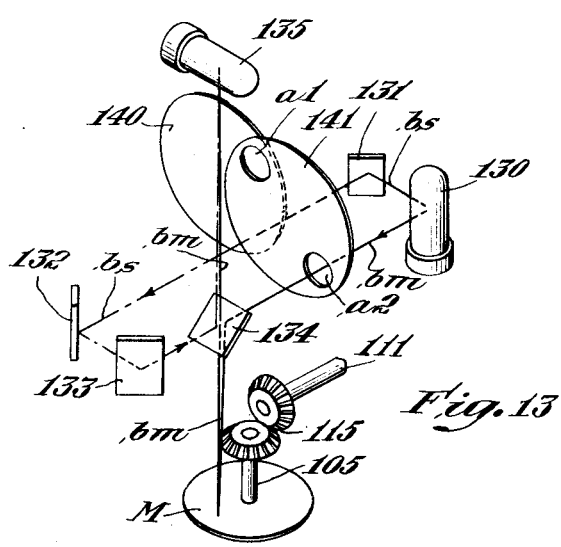

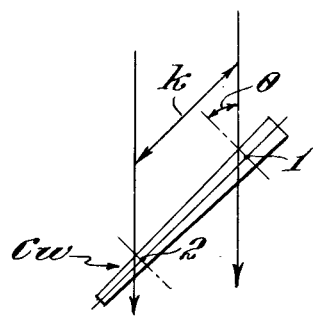
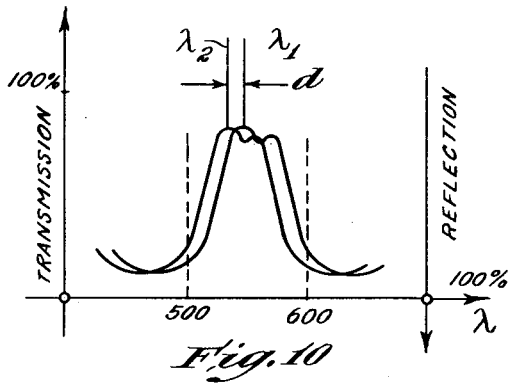
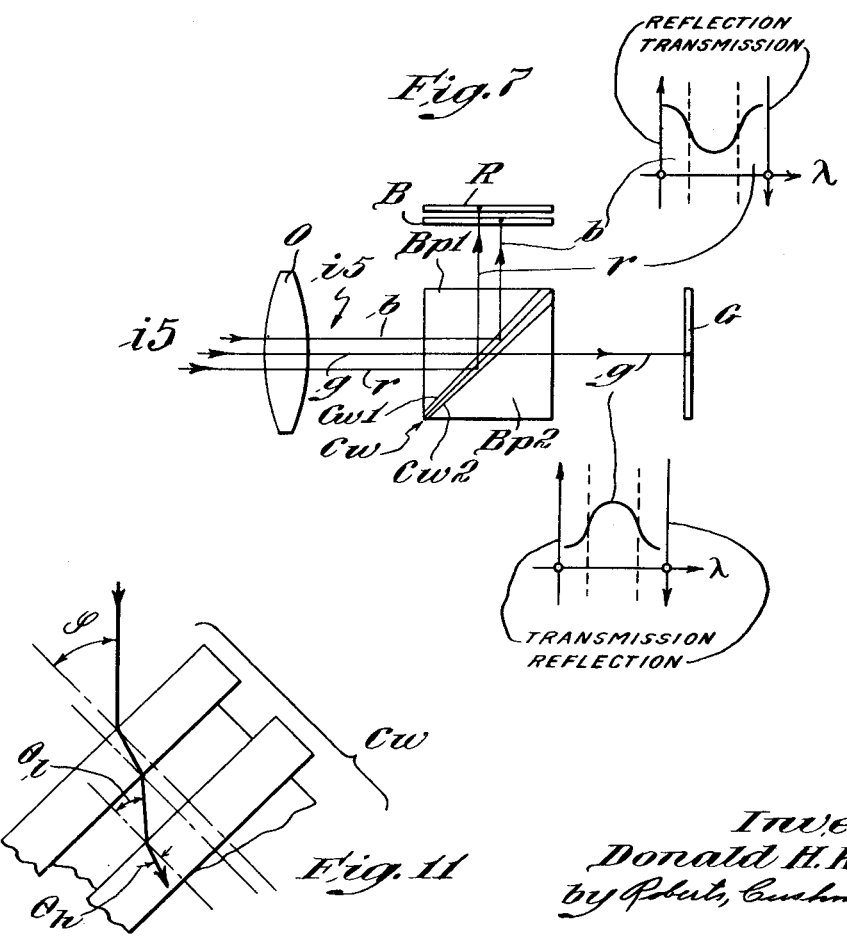

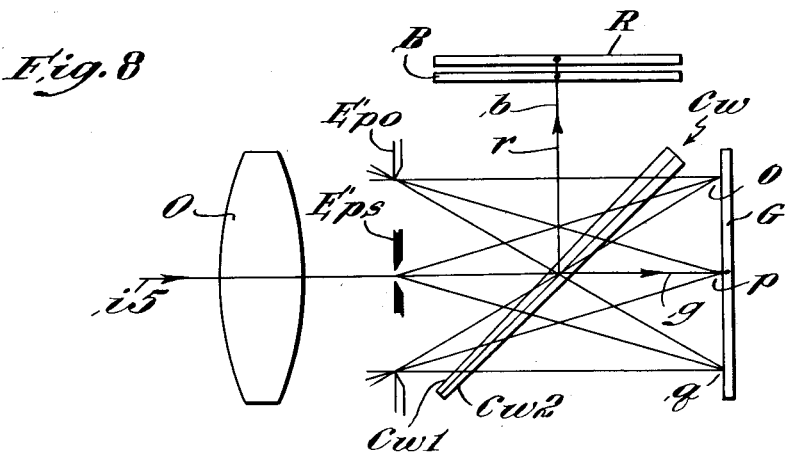
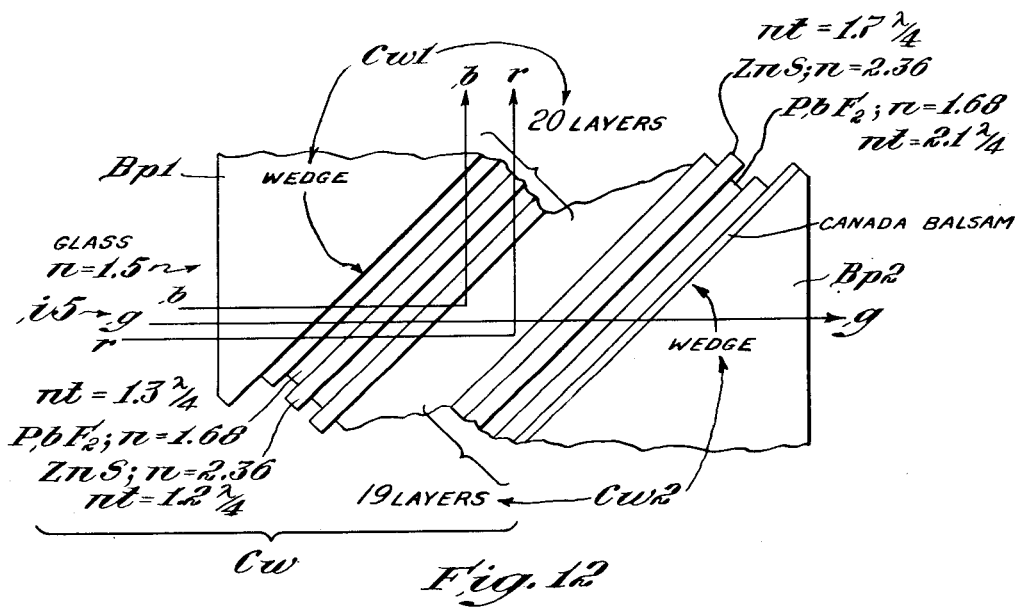

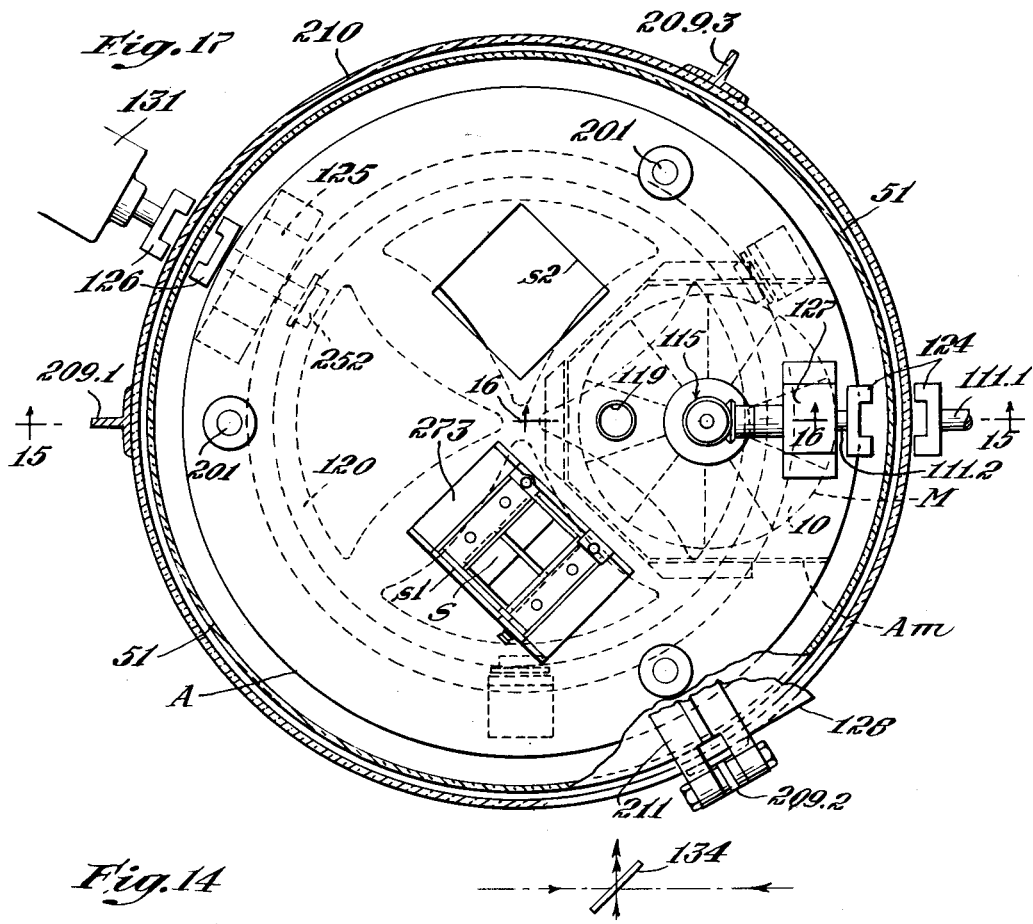

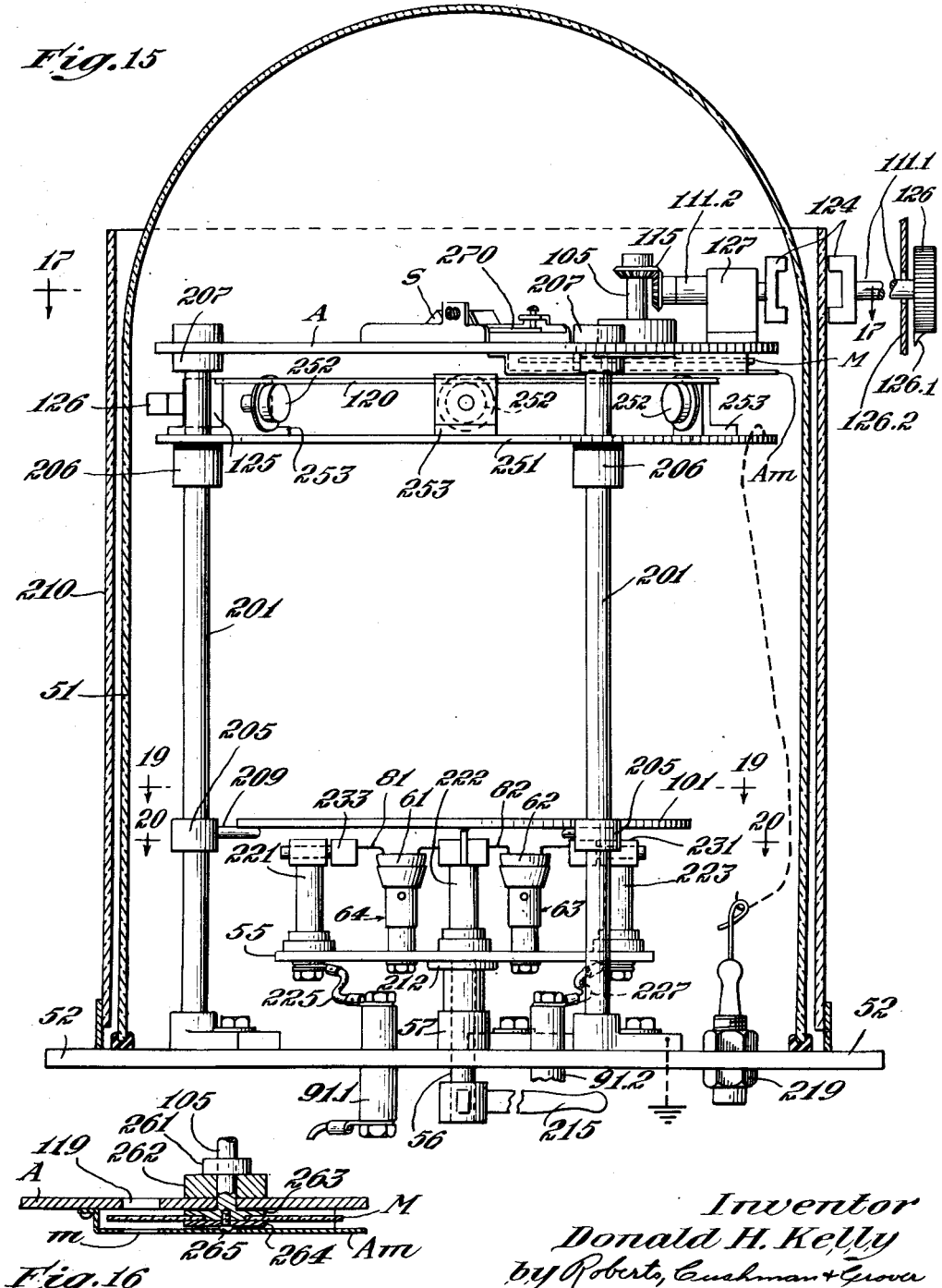

Nov. 20, 1956   D. H. KELLY ET AL   2,771,055
APPARATUS FOR COATING OPTICAL INTERFERENCE LAYERS
Filed April 25, 1952   9 Sheets-Sheet 9
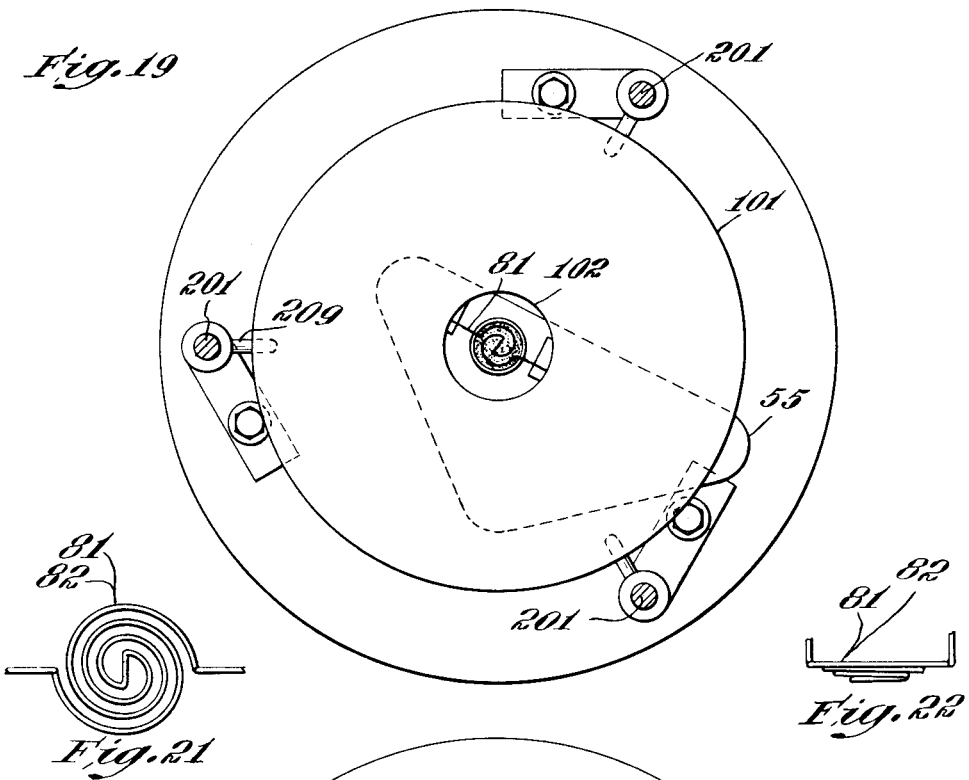
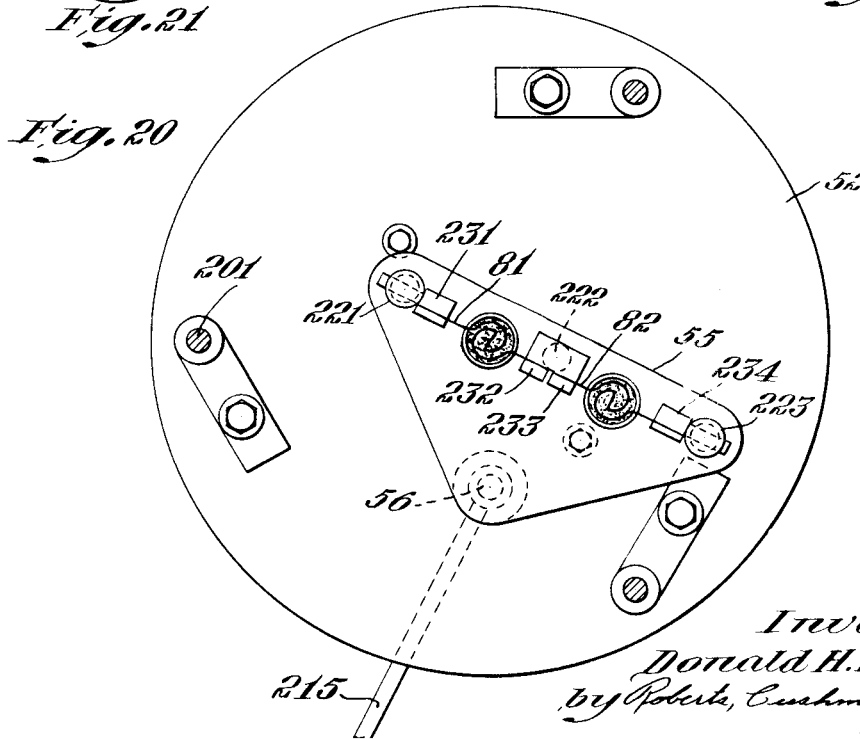
Inventor
Donald H. Kelly
by Roberts, Cushman & Grover
Att'ys.

2,771,055

APPARATUS FOR COATING OPTICAL INTERFERENCE LAYERS

Donald H. Kelly and Frank C. Rock, Jr., Los Angeles, Calif., assignors to Technicolor Corporation, Hollywood, Calif., a corporation of Maine Application April 25, 1952, Serial No. 284,410

11 Claims. (Cl. 118—9)

This invention relates to the coating of superimposed fractional wave length interference layers and includes an apparatus for monitoring the coating procedure and for coating by evaporation, which apparatus although having general usefulness is particularly advantageous.

Fractional wave length coatings are applied to surfaces of optical elements for various purposes, such as to reduce surface reflection, for polarization, as filters, and also to provide so-called dichroic reflectors which selectively reflect essentially all light of one spectral region, while transmitting the light of another region. While the exact thickness of the coatings, usually applied by vacuum evaporation of dielectric material, is often not particularly critical, it must be precisely determined for other purposes and especially those of the above-mentioned dichroic reflectors which require thickness control of extreme accuracy of a comparatively large number of superimposed layers with alternatingly different indexes of refraction. Such apparatus involves dichroic reflectors enclosed within glass bodies and presents as an additional problem the fact that the device as finally put to practical use cannot be duplicated within the evaporation vessel for control purposes during the coating.

Previously known methods of controlling the optical thickness of multilayer interference coatings during deposition can be grouped into two main categories, namely evaporation of a carefully measured amount of material placed in the vacuum, and supervision of light affected by control surfaces placed in the evaporation vessel, together with the specimen proper.

The first mentioned technique may be sufficiently accurate for applying so-called anti-glare coatings, but it is altogether ineffective for purposes such as the above-mentioned dichroic reflectors within glass bodies.

The second method is used in various ways which can again be grouped into two main divisions, namely visual photometry and photoelectric evaluation. For visual photometry, a standard element as well as a monitor plate are put into the evaporation vessel together with the specimen body to be coated. The evaporation process is then carried out until the coating on the monitor plate matches the standard, a separate area of the monitor plate being coated for each of the superimposed coatings of the specimen proper. The second photometric technique employs photoelectric apparatus for measuring reflection from a monitor plate coated along with the specimen surface, through a filter which transmits light of the wave length for which minimum reflection is desired; the evaporation is stopped when the photo current reaches a minimum value.

As mentioned above, only the photometric techniques are at all practical for controlling multilayer coatings, but those heretofore suggested are unsuited in the above-mentioned instances where the device which incorporates the multilayer coating cannot be duplicated or otherwise reproduced within the evaporation vessel for application of monitoring coatings. The reasons for this will be apparent from the theoretical explanations and the description of a practical embodiment, hereinbelow.

It is one of the principal objects of the invention to provide an apparatus which permits the application of multiple fractional wave length interference layers onto specimens which represent or are components of optical devices defining an ultimately operative ray geometry which cannot be duplicated during coating, and to provide apparatus for carrying out this control technique. A preferred embodiment has the object of applying dichroic reflectors to glass bodies which, after coating, are complemented with glass bodies providing an essentially cubical prism with a diagonal light dividing surface. Other objects are to provide a system especially suited for the coating of a fairly large number of interference layers of alternately different material and if desired wedge shaped, with a dimensional exactness that takes full advantage of the possibilities of the control procedure according to the invention, and to provide photoelectric detection and indication apparatus permitting the reading of values intermediate of extreme values of reflection from a monitor plate, which readings can be inherently calibrated to correspond to extreme reflection values of a system into which the coatings are eventually incorporated. Still other objects are to provide an interference layer coating technique which is suitable for the very exact coating of comparatively complex optical devices, but is nevertheless comparatively simple and time saving so that it can be used for the commercial manufacture as distinglished from experimental laboratory preparation of such coatings.

In accordance with the invention, these objects are accomplished by simultaneously depositing optical interference layer material on a surface of a specimen body which defines a predetermined operational ray geometry (such as the light path within a prism enclosing a dichroic reflector at 45° to the incident ray) and a monitor surface (such as a plate surface coplanar with the specimen surface) with alternate layers of such material deposited in superimposition on the specimen and in separate layers on different areas of the monitor plate, by directing during this depositing a light ray toward the monitoring plate for reflection thereon as a supervisory signal into a light sensitive detector in a measuring path which is unlike the operational path as defined by the ray geometry of the specimen, and in reading on an indicator the intensity of light reflected from the monitoring surface in terms which are a function of maximum reflection values from the simultaneous deposition on the specimen body in the operational path; this function can be based on extreme readings on the supervisory signal. The operation of transferring, according to this function, any value of the supervisory signal based on a measuring ray of a selected wave length in a measuring path, to an extreme value defining a specimen coating for an operational ray of an operational wave length in an operational path, can be performed by way of function defining aids such as a chart or with computing apparatus interposed between the supervisory light ray and an indicator which can be directly read in terms of specimen coating thickness, for example on a fractional wave length scale.

In another important aspect of the invention uniformity of the coatings is assured by maintaining a constant distance between the surface to be coated and the surface of the evaporating material; this is accomplished by contacting the heating element with the material and by advancing the material as it evaporates from its surface, towards the filament to maintain the contact. According to the invention, the filament is sufficiently strong up to and at the evaporating temperature to withstand the advancing force.

Other objects, aspects and features will appear, in addition to those contained in the above statement of the nature and substance including some of the objects of the invention, from the herein presented outline of its theoretical basis, and from the following description of typical practical embodiments thereof illustrating its novel characteristics. This outline and description refer to drawings in which Fig. 1 is a diagram illustrating the principal features of apparatus according to the invention;

Fig. 6 is a diagram incorporating the functional relationship between any value of reflection in a monitoring path of light of a monitoring wave length from a monitoring coating, and extreme values of reflection in an operational path of light of an operational wave length from a specimen coating;

Fig. 7 is a schematical section through a camera system incorporating wedge shaped prism coatings;

Fig. 8 is a diagram illustrating control of color distribution over an image field;

Figs. 9, 10 and 11 are diagrams illustrating a technique of coating wedge shaped interference layers according to the invention;

Fig. 12 is a diagrammatical fragmentary cross section of a prism such as shown in Fig. 7;

Fig. 13 is a schematical axonometric view of the monitoring arrangement diagrammatically indicated in Fig. 1;

Fig. 14 is a side elevation of the upper portion of the evaporator according to Fig. 1, showing the photometer support;

Fig. 15 is an axial section of an evaporator of the type schematically shown in Fig. 1, with the interior equipment in elevation;

Fig. 16 is a section on lines 16—16 of Fig. 17;

Fig. 17 is a detail section on lines 17—17 of Fig. 15;

Fig. 18 is a detail view of the rotating mask shown in Fig. 17;

Fig. 19 is a section on lines 19—19 of Fig. 15;

Fig. 20 is a section on lines 20—20 of Fig. 15;

Figs. 21 and 22 are top elevation and side view, respectively, of a filament as indicated in Fig. 1;

Fig. 23 is a detail elevation of the crucible assembly also shown in Figs. 1 and 15;

Fig. 24 is a plan view of the specimen support;

Fig. 25 is a section on lines 25—25 of the specimen support according to Fig. 24; and Fig. 26 is a section on lines 26—26 of Fig. 24.

In order to facilitate the perusal of the drawings, similar elements are sometimes designated as a group by way of decimal numbers or composite letters; in such instances, the integer or the first letter alone refers to the entire group.

Outline of the invention

Figure 1:
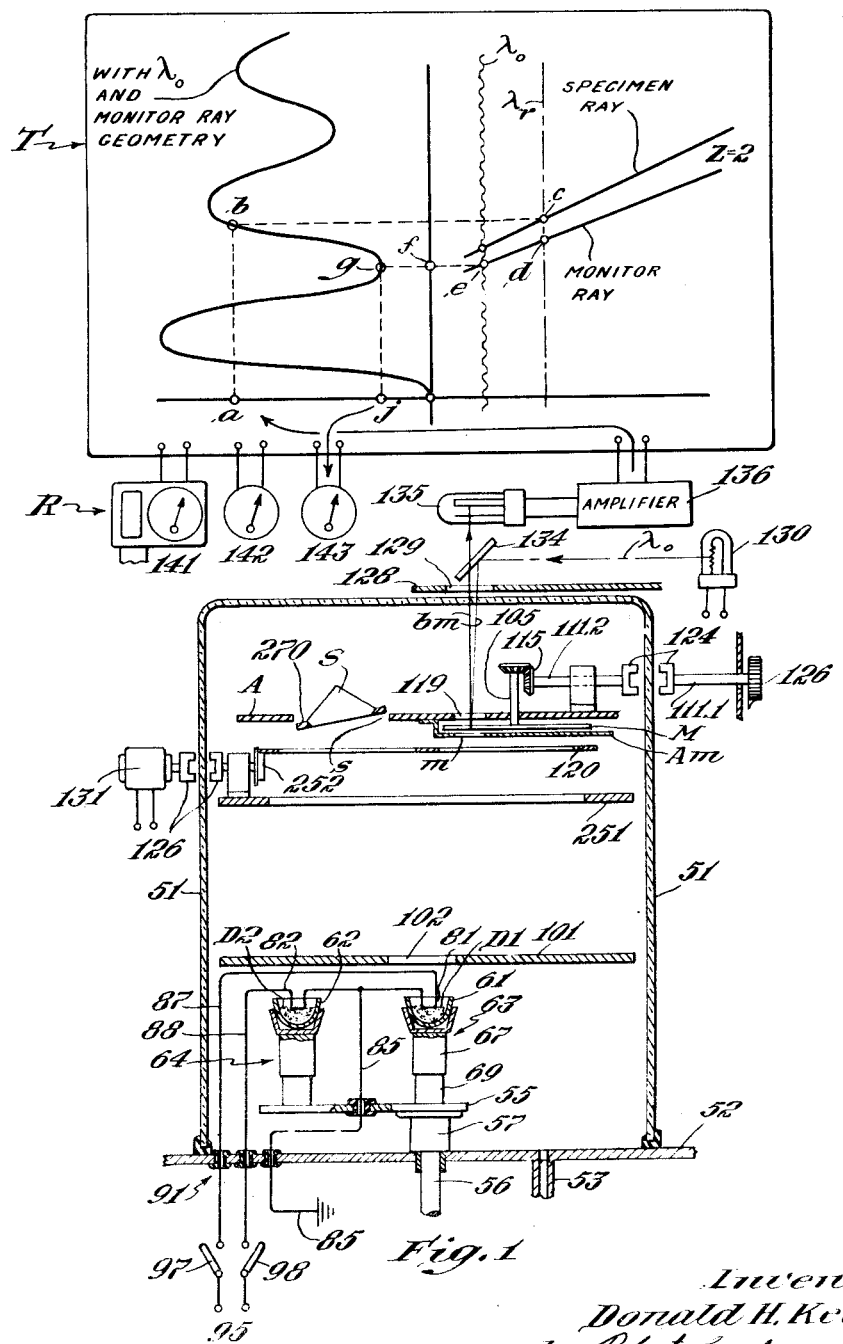

The invention will first be outlined in its broad aspects, with reference to Fig. 1; the theoretical basis so far as necessary for a proper understanding, and details of construction and technique will be presented under separate headings.

Fig. 1 shows a conventional bell jar 51 resting on a base 52 with a duct 53 for evacuating the jar. A turret or base 55 is supported on a rotatable shaft 56 which reaches through base 52 by way of a conventional bearing 57 constituting a high vacuum seal. Two crucibles 61, 62 are supported on spring supports 63, 64 which are fastened to base 55.

Mounted within the bell jar at a fixed height are evaporation filaments 81, 82 which have a common lead 85 and supply leads 87, 88 respectively. These supply lines are brought through base 52 by suitable bushings 91.1 and 91.2. Lead 85 can be grounded, whereas leads 87, 88 are through switches 97 and 98 connected to a suitable power supply indicated at 95.

The shield 101 with aperture 102 is suitably fastened within the jar 51, above the crucible assembly above described. The turret base 55 and the crucible supports 63, 64 are so arranged that, by rotating the turret at 56, either one of crucibles 61 and 62 with filaments 81, 82, respectively, can be brought below aperture 102 for evaporation therethrough of dielectric material D contained in the crucibles.

Within the upper part of the bell jar is mounted the specimen and monitor assembly. By means not shown in Fig. 1 but described hereinbelow, a specimen S to be coated and a monitor or control plate M of glass are mounted on an aperture plate A which has a specimen aperture $s$, window 119 and a monitor mask A$m$ with a monitor aperture $m$. The specimen S can be mounted on a tiltable frame 270. The monitor plate M is rotatable about shaft 105 which can be turned a predetermined amount for example by means of control knob 126, through magnetic link 124, gear 115, and shafts 111.1, 111.2. In this manner, successive areas of monitor plate M can be aligned with monitor aperture $m$ and window 119.

An attenuating mask 120 is rotatably supported below aperture plate A. This mask 120 can be turned for example by means of friction roll 252, magnetic link 126, and motor 131.

The supervising photometer system is mounted on a platform 128 above the jar 51. Its basic elements are a light source 130, a semi-transparent reflector 134, a light sensitive detector such as a phototube 135 connected to an amplifier 136 which feeds into a translating unit T, and an indicator unit R which, for reasons to be discussed in detail below, is herein shown as several meters 141, 142, 143, one of which is preferably a continuously recording instrument 141.

Instead of using the translator T, the signal derived from phototube 135 can be fed, after suitable amplification, directly to a meter, and the function of the translator replaced by manipulation of charts or by any other means suitable for translating, without any mental effort, the input signal in the manner to be described in detail hereinbelow. The translating device, or any other functionally equivalent instrumentality permits transformation of the monitoring signal at 135, corresponding to the thickness of deposit on M and to a given monitoring ray geometry, into terms of layers deposited simultaneously on specimen S, effective in predetermined manner, in a finished optical device incorporating specimen S, and having a specimen ray geometry and wave length which, generally speaking, can and will differ from those of the monitor set-up.

The method according to the invention is carried into effect by means of apparatus such as outlined above, in the following manner, it being understood that the immediately following exposition will be supplemented and further clarified hereinbelow with reference to a specific embodiment.

With the bell jar 51 lifted, coating material D1, D2 of suitable indexes of reflection $nl$, $nh$, is placed into crucibles 61 and 62 respectively. The spring supports 63, 64 are so adjusted that the surfaces of the materials D1, D2 will just rest against filaments 81 and 82, respectively. The crucible with the material first to be evaporated is placed under aperture 102. The specimen S and a monitor plate M having been inserted, the bell jar is lowered onto its base and evacuated. After certain preliminary precautions to be described below have been observed, attenuating mask 120 is rotated, the switch corresponding to the crucible under the aperture 102 closed, and material from this crucible evaporated on specimen and monitor plate by the hot filament. During this evaporation, light from lamp 130 is reflected by mirror 134 towards the monitor area of M which is being coated, and from there by the control layer on the underside of M reflected into photocell 135 through transparent reflector 134. It will be understood that the supervising light has the monitoring wave length λo as indicated in Fig. 1. Upon translation through T of the input signal at 135, 136 into terms of specimen wave length and geometry corresponding to extreme reflection values from the coating on specimen S, the thickness of the latter can be read at R in appropriate units. After the desired thickness of the specimen layer is reached, evaporation is suddenly interrupted by opening the respective switch 97 or 98 and by quickly rotating the corresponding crucible away from aperture 102, under shield 101.

The other crucible is then moved below aperture 102 and the above performance repeated until the appropriate number of layers is coated.

*The functional relation between monitor and specimen coatings*

The theory of optical interference layers is now well understood, but in order to apply it to the present situation and to establish the terminology herein used, it will be shortly recapitulated as follows.

Figures 2, 3, 4:
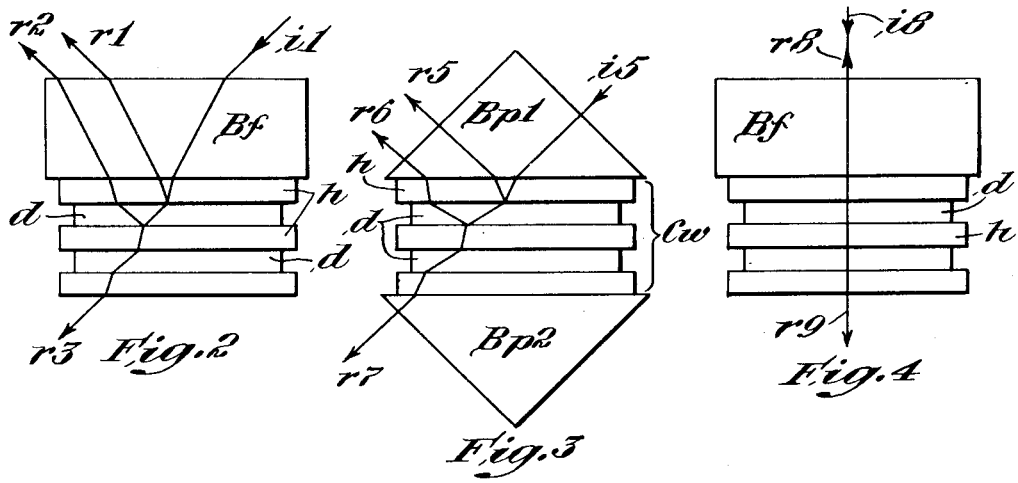
Figs. 2, 3 and 4 are diagrammatic cross sections of bodies coated with interference layers.

Referring to Fig. 2, Bf is a body for example of glass which supports a group of interference layers, low index layers being represented by the shorter bars $d$ and high index layers by longer bars $h$. An incident ray $i1$ is refracted and reflected at the various surfaces which separate bodies of different index. Of the various distinct reflections only the two rays $r1$ and $r2$ coming from opposite faces of a low index layer are shown in Figs. 2 and 3.

The wave lengths at which any two reflected rays such as $r1$ and $r2$ of Fig. 2 augment or cancel each other are given by the following equation:

$$Z\lambda = 4nt \cos \theta$$

wherein:

Z is an integer
λ is the wave length
$n$ is the refractive index of the dielectric layer at wave length λ
$t$ is the mechanical thickness of the layer, and
$\theta$ is the refractive angle of the ray within the layer The product $nt$ is the "optical thickness" of the layer in question, and the actual path difference between the two rays, such as $r1$ and $r2$ in Fig. 2, is Zλ. If Z is an even integer, the interference between the two reflections is destructive, that is reflection is attenuated in favor of transmission, whereas if Z is odd the interference is constructive, that is in favor of reflections as against transmission. Z is called the "order" of interference.

While the determination of the required thickness of a given layer for extreme (maximum or minimum) reflection of light of any desired color as represented by a wave length λ is an elementary calculation, the measurement of these thicknesses during application presents a considerable problem especially when many layers are superimposed and if the ray geometry of the optical device incorporating the coating for its ultimate operational purpose is taken into account. This problem exists for the following reasons.

Referring again to Figs. 2 and 3, it will be noted that Fig. 2 shows a flat supporting plate Bf whereas Fig. 3 shows a body Bp1 supplemented by a similar body Bp2, each being a prism of triangular cross section with 45° and 90° angles, and cemented to form essentially a cube which encloses high and low index interference layers $h$, $d$ corresponding to those of Fig. 2. In the practical embodiment herein dealt with, the layers $h$, $d$ represent a dichroic reflector coating which transmits light of one color and reflects the complementary color, as indicated by reflected rays $r5$, $r6$, and transmitted ray $r7$. It will be noted that the path difference between the two rays $r1$, $r2$, reflected from the coating on the flat plate Bf of Fig. 2, is not the same as the path difference between the two rays $r5$, $r6$ reflected from the coating between the prisms of the cemented cube of Fig. 3, due to the respectively different effect of the glass refraction upon the inclination of the ray path through the dielectric layers, although rays $i1$ and $i5$ are parallel. Consequently, the maximum interference between the two reflected rays will occur at different wave lengths, and the color of the reflected light will thus be different according to Fig. 3 than according to Fig. 2, even though the angles between the incoming rays and the interference layers as well as the layer thicknesses are identical in both cases. It will be noted that this is true although the general purpose of the two arrangements according to Figs. 2 and 3 respectively is the same, namely partly to reflect and partly to transmit a principal ray incident at 45° with respect to the dividing surface represented by the dichroic coatings.

While the above described discrepancy is especially apparent with respect to low index interference layers, it is also present for any two rays reflected from opposite sides of a high index layer. However, the wave length reflected from a high index layer changes, with respect to the angle of incidence, at a rate very different from that reflected from a low index layer. As a result, there exists a very complex relation between the interference patterns formed by the entire coating for rays at any two angles different from normal incidence as represented by principal rays $i1$ and $i5$ respectively. Thus is borne out the above remark that, while it is simple to calculate the required thickness of any given layer for reflection of any desired wave length, the actual construction and control of the coatings of an optical body with finite dimensions determining a corresponding ray geometry is usually quite difficult.

As already pointed out, the previously employed techniques of supervising the coating of interference layers are not suitable for dimensioning filters which are to be applied between parts of a supporting body defining a certain ray geometry, such as the prism block described above with reference to Fig. 3. This is particularly true if this ray geometry involves a comparatively large angle between incident ray and interference coating, as in the cemented beam splitter schematically represented in Fig. 3.

It will now be evident that flat monitor plates used in the conventional manner are totally unsuited for supervising the coating of surfaces to be incorporated in devices which ultimately do not have a ray geometry that can be reproduced during coating. The flat monitor plate does not reflect the same color to the optical supervisory system as will be reflected by the completed device incorporating a coating of the same layer thickness. For example the cemented cube according to Fig. 3 reflects differently from the flat of Fig. 2 but cannot be used as the monitor body, because if the bottom half Bp2 of the cube were removed, total reflection would result, no light would be transmitted through the hypotenuse face, and the reflected beam would have no color.

The most detrimental factor leading to unsatisfactory results in attempting to use a flat plate at the same incident angle as that of the ultimate specimen ray geometry is due to the above explained wave length shift of the interference maximum with angles of incidence. It will now be apparent that the reflection peaks for Fig. 2 will move towards shorter wave lengths as compared to normal incidence of a ray $i8$ upon the same structure as indicated in Fig. 4. These peaks will shift even further in that sense, in an arrangement according to Fig. 3. Moreover, it is impossible to increase the angle of incidence for the flat plate according to Fig. 2, enough to provide an incidence angle at the interference layers equal to that in a prism according to Fig. 3. Thus there is no way of duplicating the practical condition represented by Fig. 3 before the layers have been completed and prism Bp2 has been applied.

While this problem has been explained with reference to a cubical light splitting prism, it will be readily understood that it exists for any optical device which employs enclosed interference layers, and has a ray geometry that cannot be reproduced during coating.

According to previous control systems, a control filter is chosen to transmit light of the wave length for which extreme (minimum or maximum) reflection is desired. It will now be appreciated that this wave length would be considerably different for the cemented cube in ultimate shape than for the control plate. If the wave length shift were the same for both layer materials, it might be compensated by using a different filter in the monitoring system. Unfortunately however, the wave length shift for the high index material is considerably less than that for low index material, so that if the reflection peaks for two layers of different materials are made to occur at the same length for a control plate such as according to Fig. 2, they will no longer coincide in the cemented condition according to Fig 3. While such errors are of little consequence for certain practical purposes such as glare reducing coatings, they cannot be disregarded in cases where the layer thickness is rather critical such as in the case of dichroic reflectors where the total number of layers is especially great in order to obtain maximum reflectance or sharp interference peaks.

These difficulties are overcome according to the present invention by way of the technique the practical fundamentals of which are outlined above, and which will now be explained more in detail with reference to the underlying theory.

My new control technique abandons the concept of measuring only maximum and minimum indications, using instead readings of intermediate values of monitoring light to indicate when the evaporation should be stopped in order to produce a maximum or minimum reflection at any desired wave length, for any desired ray geometry or ultimate configuration of the device in question.

Another very important feature of the invention is the abandonment of monitoring ray angles other than zero, and the adoption instead of a control system in which the beam of light is reflected from the control plate at the angle of incidence as indicated in Fig. 4. With that monitor ray geometry the path difference between any two reflected rays is always exactly twice the optical thickness of the layer which is measured. If the control beam incidence is zero degree, that is exactly 90° to the plane of the interference layers, so that it is returned along the same path, all possibility of inaccuracies due to path variations are inherently excluded. Such a ray reflected into itself presents however certain problems of optical and mechanical construction, a solution for which will also be described herein.

According to the present technique, there is further used as a monitor plate a glass disc on which a separate area is simultaneously coated with each one of the superimposed layers of the specimen proper. This monitor disc is rotatable from the outside of the evaporation vessel and masked off so that only that part of the plate which is in the path of the supervising light beam is exposed to the evaporating material. Thus each layer of material is for control purposes deposited on a fresh glass surface so that the signals from all layers of the same index and thickness are identical.

Figure 5:
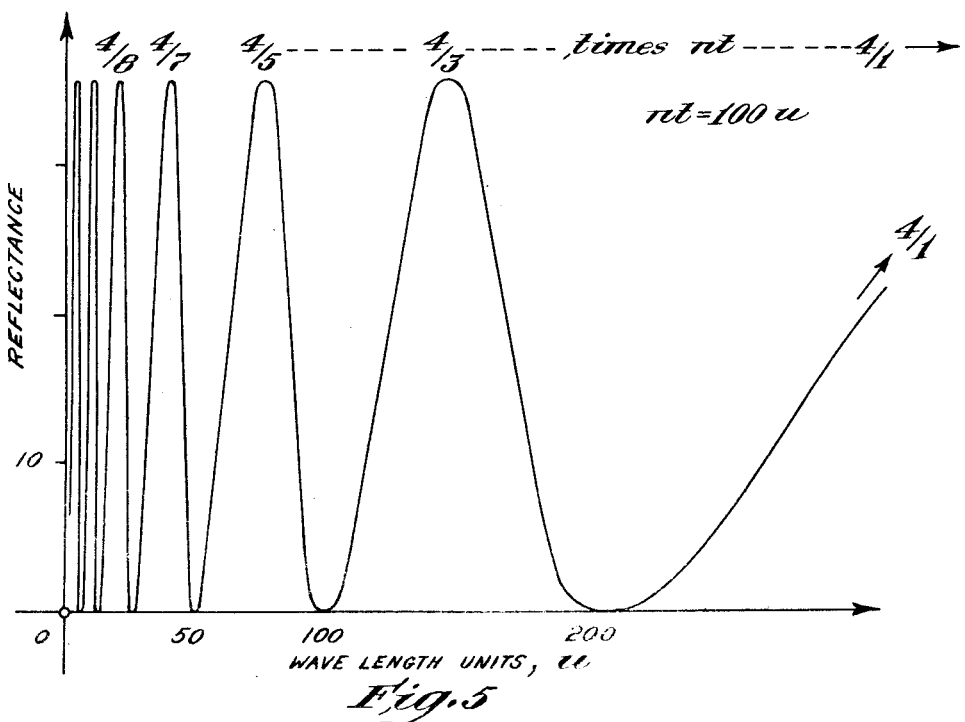
Fig. 5 is a diagram illustrating the relation between reflectance from a coating and the wave length of the reflected light.

As a further feature, light of the shortest wave length practical for control purposes is used for supervisory purposes, and selected by means of an appropriate filter. This assures sufficiently precise supervision in the shorter wave length region which requires the most accurate control. The short wave length control beam can be used for all operational wave lengths because for a given layer thickness, the locations of interference peaks at longer wave lengths are very critical functions of the shorter wave length peaks as shown in Fig. 5. This predictable relation between short wave length supervisory rays and light of any wave length for actual operation permits the use of the especially favorable short wave length light for supervising.

As an additional feature, the glass to air reflection at the back surface of the monitor plate, as well as scattered light and other undesired signals can be cancelled out by means of a suitably selected monitoring system, so that only changes in the reflected control beam due to interference caused by the deposit are shown. A practical embodiment of a suitable monitoring system will be described herein.

The above indicated features make it possible to calibrate an indicator instrument which evaluates the signal received from the monitor plate, such that it will read zero for zero thickness (absence) of monitor coating, and full scale for a quarter wave thickness of any material differing substantially in index from the monitor plate proper. This forms a basis for the general transformation of the initial signal from the monitor plate into terms of optically effective layer thickness of the specimen proper.

As an ancillary feature, the above arrangement of the supervising ray permits a provision for improving the monitoring technique if the low index material has an index of refraction which is so close to that of the glass support that sufficient sensitivity cannot easily be obtained. The monitor plates can then be precoated with layers of high index material of quarter wave length thickness, over which the low index material is then evaporated, giving greatly increased sensitivity.

Coming now to a more detailed explanation of the derivation from a monitor arrangement of the proper layer thickness for the ultimate device of which the specimen to be coated is a part, the behavior of the monitor system herein proposed will first be described with reference to Fig. 5.

Fig. 5 is a diagram which shows the correlation of the wave length interference pattern for a film of fixed thickness with varying wave lengths. The wave lengths are indicated in arbitrary units $u$, for a high index material in a layer having a thickness $nt$ of 100 wave length units.

Reflection maxima occur at the wave lengths where the optical thickness $nt$ is $4\gamma$ which corresponds to 400 arbitrary units and further to four times the thickness of the high index layer chosen as a basis for this diagram. Other maxima occur at all shorter wave lengths such as $4/3$, $4/5$, $4/7$, $4/9$, etc. of the optical thickness $nt$, progressing in this order from the right hand side of the chart towards the zero wave length axis. In Fig. 5, limitations of space did not permit the actual showing of peak $4/1$ on the extreme right hand side but it is indicated by arrows labeled $4/1$. Thus, on a linear wave length scale, the reflection peaks come closer together as the wave length decreases. Since the wave length has been plotted in arbitrary relative units, this diagram can be taken as representing a film of any thickness desired, so long as the actual practical thickness is properly correlated to the arbitrary wave length and thickness scale chosen. With this in mind the relations illustrated in Fig. 6 can be explained.

In the left hand part of Fig. 6 marked "I," indicator readings in terms of arbitrary meter increments (which can be calibrated in terms of layer thickness expressed in wave length fractions) are plotted against optical thickness of a deposit. This diagram is based on a control wave length $\lambda_0$ and meter reading zero is applied to the reflection from the bare monitor plate at $nt=0$. The optical thickness is applied in a linearly increasing scale. It should be kept in mind that whereas diagram Fig. 5 is plotted for a constant layer thickness of 100 wave length units, the left hand I of Fig. 6 is plotted for a constant control wave length $\lambda_0$, with varying optical thickness and accordingly varying meter readings. The signal values in Fig. 6 increase from zero for zero layer thickness to nearly full scale of the meter reading at $1/4\lambda_0$, go to a minimum at $2/4\lambda_0$, rise to a lower maximum for $3/4\lambda_0$, etc. This curve can be obtained by actual production experiment for any material of desirable index and any control wave length $\lambda_0$, as indicated in Fig. 1 by a separate meter such as 142, calibrated for the purpose of obtaining the control wave length meter readings according to Fig. 6, in any desirable scale.

Once the above relation has been laid down, whether by way of a curve of the type of Fig. 6 or otherwise, the monitor film thickness is known at any time through the entire coating operation and any film thickness at all can be obtained by stopping evaporation at the appropriate indicator reading corresponding to that thickness. Thus continuous thickness control as distinguished from that bound to extreme values, can be obtained. This is of special importance as will be presently apparent, because it permits the correlation of specimen layer thickness for a given ultimate ray color and geometry on the one hand and monitor layer thickness on the other hand; this correlation can be taken advantage of only if perfectly continuous control and functional relationship between the monitor and specimen layers can be maintained.

Although the present monitoring technique employs a single, low value "control wave length" $\lambda_0$ the zero degree reflection (90° to the monitor plate) of which is used as initial signal, it will be understood that the sensitivity of any such system has a finite band width, due to the necessity for emitting a finite amount of energy and the unavoidable deviation from theoretical perfectness of the optical components, such as filters. As the thickness of the layer which is measured increases indefinitely, the reflection peaks as shown in Fig. 5 will eventually become narrower than this band width, with a corresponding decrease in the total sensitivity of the optical system. This phenomenon appears in the left hand part I of the diagram according to Fig. 6 as a decrease in the peak-to-peak amplitude of the measured reflection.

There remains now the correlation of signals varying according to the diagram I of Fig. 6 (such signals representing the interference pattern obtained from the monitor device with wave length $\lambda_0$ and the ray geometry of Figs. 1 and 4), with the interference layer dimensions of the specimen, suited for use in the ultimate device, that is the correlation of the monitor signal to the interference pattern produced by the corresponding specimen layers such as for example a coating cemented between glass blocks at 45° to the incident rays, as shown in Fig. 3. This relationship is illustrated in the right hand part marked II of Fig. 6, which is drawn for the purpose of correlating the geometry according to Fig. 3 to that of Fig. 4, although it will be understood that the specimen according to Fig. 3 is merely an example and that similar functions can be derived for other ray geometries and general configurations of the optical device of which the specimen to be coated is a component.

The relation between the situations according to Figs. 3 and 4 respectively can be expressed by the equation $$Z_0 = Z \frac{\lambda}{\lambda_0} \frac{n_0}{n} \frac{1}{\cos} \theta \qquad (2)$$

where:

$\lambda_0$ = control wave length
$n_0$ = index at control wave length $\lambda_0$
$Z_0$ = order appearing at control wave length $\lambda_0$
$\lambda$ = any other desired wave length for which a given layer must have a predetermined reflection characteristic
$n$ = index at $\lambda$
$Z$ = order desired for $n$ and $\lambda$
$\theta$ = refractive angle within the layer with $n$ and for $\lambda$, according to Snell's Law This equation follows directly from Equation 1. If the indexes of all materials, including the glass blocks are known, functional relations similar to that exemplified by diagram II of Fig. 6 can be worked out for all extreme reflection values and used to control specimens of the given geometry. It will be noted that control wave length $\lambda_0$ is marked on the wave length scale of II and that the thickness scales of I and II are identical, although that of I is marked in terms of $nt$ and that of II in terms of K multiples of $\lambda_0$ with $K=\lambda_0/4$ (1, 2, 3 . . .). The lines marked "45°" define the thickness as function of the wave length for the ultimate specimen geometry (Fig. 3) whereas the lines marked "90°" do the same for the monitor geometry (Fig. 4). These functions are laid down for consecutive Z values as indicated at II for the curve groups (45° and 90°) as well as on the thickness scale.

Referring now again to Fig. 1, the functional relationship as laid down in Fig. 6, can be incorporated in a suitable computing device T of conventional design which operates as follows:

The input signal as detected by phototube 135 at wave length $\lambda_0$ and amplified at 136, has a magnitude corresponding for example to position $a$ of Fig. 1, assuming that $Z=2$ is selected. Value $a$ is transformed through the corresponding position $b$ of the signal-thickness relation I for the monitor plate to position $c$ corresponding to the operational, predetermined wave length $\lambda_r$ to be reflected by the ultimate device, from there to position $d$ which corresponds to $\lambda_r$ for the monitor, from there to position $e$ which corresponds to the wave length $\lambda_0$ for the monitor, and from there to position $f$ indicating the thickness value for which the ultimate specimen will have the desired extreme reflection, as indicated at $g$. If the indicator, for example meter 143 of Fig. 1, is calibrated in fractions of $\lambda$, these final values can be directly read at $j$. It will now be evident that peak values $j$ for the ultimate device are directly evaluated in terms of off-peak values $a$ for the monitor system. Fig. 1 also indicates the above-mentioned meter 142 which can be calibrated in terms of monitor layer thickness, and a recording meter 141 which can be inserted for the purpose of laying down the history of each coating.

If, instead of using the translator T indicated in Fig. 1 whose operational characteristics are above described, it is desired to use so to speak hand operation by means of separate translating aids such as charts or tables, the following procedure is followed.

Supposing that a half wave transmission band, corresponding to an even number Z (for example 2) is desired at wave length $\lambda$ for example 500, the $\lambda$ ordinate 500 is followed at II of Fig. 6 until it intersects at $c$ the specimen geometry line marked 45° for $Z=2$. The corresponding point on the abscissa can now be read and directly transferred through $b$ into indicator reading terms such as $a$, by means of diagram I of Fig. 6. This transformation is similar to the one described above with reference to automatic operation. If the automatic technique is chosen, meter 142 may be used, reading in terms of monitor layer thickness.

A control chart according to II of Fig. 6 shows also the location of other interference bands for any given signal and hence facilitates the choice of the order Z to be used for a given reflection. The "90°" curve of Fig. 6 further permits the control of layers coated to flats according to Fig. 2. A comparison of the "90°" and "45°" curves indicates directly the amount of wave length shift or color change to be expected when cementing the prism cubes. According to previous techniques this information could only be obtained by trial and error.

It is frequently desirable to apply wedge shaped coatings with steepness gradients that can be determined and reproduced for a given purpose. The system according to the present invention is particularly suitable in this respect, in the manner now to be discussed with reference to a practical example.

This example is a light dividing system for use in color motion picture cameras of the type such as described in Patent No. 2,072,091 of March 2, 1937 to J. A. Ball et al.

Fig. 3 illustrates the general structure, and Fig. 7 the photographic function of such a system. The three spectral ranges b, g, r contained in incident beam i5 are separated at the interference coating Cw as indicated in Fig. 7, with the green range transmitted and the blue and red ranges reflected. The blue, green and red color aspects of an image formed by lens system O are recorded in layers B, G, R respectively of appropriately sensitive photographic material.

We found that in order to obtain a color distribution over the recording surfaces which is essentially uniform for photographic purposes, the coating Cw should have a wedge shape which is related to the rays defined by the entrance pupil of the lens system. As indicated in Fig. 8, such rays are defined by the open pupil E'po and the stopped down pupil E'ps. By relating the wedge configuration to these divergent rays of unequally oblique incidence, the wave lengths and intensities as received at points o, p, q can be adjusted to provide compensation or regulation within predictable limits of the field distribution of saturation, brightness and hue, while permitting interchangeable use of lens systems of different focal lengths.

In the present example, the color separation is accomplished by way of two superimposed coatings Cw1 and Cw2, reflecting the blue and red ranges respectively and both transmitting the green range, as indicated in Fig. 7.

The wedge shaped coatings are applied starting with data based on the known performance of a given coating apparatus such as herein described and the optical relations defined by the above formula (1). The direction and relative magnitude of the wedge gradient is approximately predetermined for the particular purpose at hand which may require optimum uniformity of color distribution or other predetermined distribution over the field or fields of the device in question. These data are correlated with previous calibration data in terms of inclination of the surface being coated within the evaporation apparatus, and of thickness monitoring data. Means for tilting the surface are indicated at 270 of Fig. 1 and will be described in detail below.

The coating is then tested spectrophotometrically, with rays parallel to each other and the system axis, and incident at two different points separated by a known distance $k$ as indicated in Fig. 9. Assuming that the device in question employs a coating according to Fig. 3, the angle of incidence is 45°. It will be understood that other angles are feasible, such as 30° in well known prism devices.

The peak wave length is measured at the two points 1 and 2, separated by distance $k$ (Fig. 9). Thus two wave lengths $\lambda_1$ and $\lambda_2$, separated by an amount $d$ are obtained. Assuming that the contributions of the layers of each material are approximately the same, which assumption was found to be acceptable for many practical purposes, the thickness difference $D=t_1-t_2$ can be expressed in terms of the above interference equation as $$D=t_1-t_2=d/4n \cos \theta \qquad (3)$$

Fig. 10 indicates the spectrophotometric curves and the above-mentioned values $\lambda_1$, $\lambda_2$ and $d$. This pair of curves was obtained from a coating of the type described below with reference to Fig. 12.

The refractive indexes of the materials used for the respective alternate layers are known and therefore the ray angles in each layer can be calculated from Snell's Law, since the traversing angles $\theta_h$ and $\theta_1$ for the high and low index layers, respectively, are also known, compare Fig. 11 wherein these values are indicated, with $\varphi=45°$ in the embedding medium as initially assumed.

Fairly accurate results are obtained by postulating a linear wedge gradient, regardless of the difference of refractive indexes of alternate layers. An intermediate ray angle for the coating as a whole, of thickness $t_2$, $t_1$ at the given points, can be similarly postulated.

By substituting in the above formula the known values for the wave length shift D, and the individual indexes $n$ and angles $\theta$, or the above discussed intermediate values, the thickness difference $t_1-t_2$ can be calculated for the given distance $k$, which might be in the neighborhood of 25 mm., measured parallel to the coated surface.

In this manner the initially assumed data are checked and, by a comparatively short series of experimental coatings, standards are obtained for any particular specific requirement regarding color distribution across the field as determined by the coating wedge.

Theoretically accurate control of the individual layer thickness has been found to be impractical, due to the necessary superimposition of a comparatively large number of layers within a coating and the uncertainty that each single layer actually corresponds with theoretical accuracy to a corresponding monitor layer. Nevertheless, the herein described and referred to optical and evaporation technique expedients serve very well for arriving at coating dimensions which by their actual performance prove the correctness of design according to the present invention.

Referring to the above mentioned assumption of equal wedge distribution over the layers, it should be kept in mind that some deviation from such assumption is in most instances not serious or at least of second order effect. The wedge will vary with the layer thickness, especially since the optical thicknesses for the various dielectric materials are sometimes made intentionally different from each other. This has little effect on the final curves, compare the above discussion of postulated intermediate values.

Fig. 12 shows the detail construction of the two coatings Cw1 and Cw2 which are preferably superimposed directly on one of the surfaces of prism components Bp1 or Bp2 which are cemented together with a suitable optical adhesive.

In a practical embodiment, the thickness differences $t_1-t_2$ was found to be approximately 4.5 to 5 $\mu$ for points 27 mm. apart on the hypotenuse of the prism. This wedge configuration is obtained by applying the coatings to the prism face tilted during application at appropriate respective angles, by means such as indicated above with reference to specimen frame 270, diagrammatically shown in Fig. 1 and described in detail below.

It will be understood that the exact wedge shape depends not only upon the above discussed theoretical considerations but to a large degree also upon the purpose at hand since the theoretical requirements for visual uniformity do not necessarily provide photographic uniformity, and the coating configuration depends a good deal on the commercially available emulsions used and the auxiliary or marginal filters adopted for use therewith. The above described experimental measuring and controlling technique has to take into account and experimentally to include the optical properties of the installation as a whole, such as sensitometric characteristics of films, photometric properties of filters, sensitivity characteristics of phototubes and iconoscopes, and reflection, absorption and emission characteristics of projection screens and kinescopes. Thus it is impossible to give precise numerical data for exact theoretical prediction for any particular purpose.

In order to utilize the advantages of the above described technique, certain special arrangements are advantageous in order to carry out the corresponding operations.

One such arrangement involves evaluation of the chosen ray geometry of the monitoring system to obtain a translator input signal which is not affected by possible sources of error. Another arrangement involves the consecutive evaporation of different materials to form successively superimposed layers, from approximately the same location in the center of the vaccum tank in order to eliminate parallax. Related to this problem is that of avoiding layer thickness variations over the plane of deposition at points not directly above the source, and also related to this problem is the provision of a supply of evaporation material sufficient for coating a considerable number of superimposed layers. An additional problem is presented if it is desired to apply wedge shaped coatings of the type described above with reference to Figs. 7 to 12. These and other features of a practical embodiment of the invention will now be described in detail under separate headings.

*The photometer*

The monitoring system diagrammatically indicated in Fig. 1 and schematically shown in Fig. 13 is supported on a platform 128 (Figs. 1 and 14), which rests on the star-shaped upper braces 211 which connect the reinforcing and supporting columns 209.1, 209.2 and 209.3 of a protective housing for the jar 51, for example made of plastic and indicated at 210 of Figs. 14, 15 and 17.

The monitoring system proper incorporates in the present embodiment a balanced flicker photometer of the photoelectric type, in its general construction well known in the art. The platform 128 carries the following elements, appropriately arranged about an aperture 129 (Fig. 1) admitting the direct and reflected beams $bm$ coming from monitor plate M through the aperture 119 of support A, as shown in Figs. 1 and 13. Light from a suitable source 130, collimated by a conventional lens system (not shown) passes through a flicker disc 141 to a mirror 134 that is coated with aluminum strips and thus reflects as well as transmits light. The beam $bm$ is thus reflected towards monitor plate M whence a selected spectral component thereof is reflected back into itself whereupon it is transmitted through mirror 134 towards photocell 135. Figs. 13 and 15 also show shafts 105 and 111 and gear 115 of the drive for the monitor plate M. Figs. 1 and 15 show the control knob 126 with indicator 126.1 that can play on a scale, suitably calibrated, indicated at 126.2. In this manner, a fresh sector of monitor plate M can be made available for each layer coated on specimen S.

The sensitivity of the photocell is selected and controlled by conventional filters (not shown) which effectively limit it to a narrow spectral band at the lowest wave length $\lambda_0$ practical for control purposes, for the above-mentioned reasons. For example, this band can be centered at wave length $\lambda_0 = 440\mu$ for which commerical filters are available. It will be noted that the beam $bm$ is incident on and reflected from the monitor plate M at exactly zero degree, that is normal to the surface of the plate, for the above-mentioned reason of making the path difference between any two reflected rays exactly twice the optical thickness of the layer being deposited and measured.

The mirror 131 reflects a second, standard beam $bs$ likewise coming from lamp 130, towards the flicker disc 141 and to a third mirror 132, thence to a fourth mirror 133 and from there towards the first mentioned striped mirror 134 which reflects beam $bs$ towards photocell 135, in coincidence with the transmitted monitor beam $bm$. Suitable heat absorbing means and collecting lenses (not shown) are provided along this path in well-known manner. The beam $bs$ also passes through a variable density attenuating disc indicated at 140. As shown in Fig. 13, the apertures $a1$ and $a2$ of flicker disc 141 are so arranged that monitoring and standard beam $bm$ and $bs$ are 180° out of phase with respect to any given aperture $a1$ or $a2$, so that one beam is on when the other is off. The flicker disc 141 is driven by a suitable motor, but the exact flicker frequency is unimportant so long as it is very stable. In a practical embodiment the disc is driven by a synchronous motor at 1800 R. P. M. so that each beam is broken sixty times a second. By adjusting the variable density wedge 140, the intensity of the two beams can be balanced at the photocell, so that a constant signal is generated at this frequency. The output of phototube 135 is suitably amplified at 136 (Fig. 1) and fed into translator T, as above described.

The beams are balanced just prior to the coating of each layer, with the monitor beam reflected from either a clean glass sector of the monitor plate M or, if the refractive index of the coating material is similar to that of glass, the sector may be coated with a quarter wave thickness of a high index material, as mentioned above. The output of the A. C. amplifier 136 is measured in a null balance circuit so that indicators R (Fig. 1) have maximum sensitivity at this point and register any slight deviation from the glass reflection factor even for extremely thin layers coated on the monitor plate. The instrument 141 or 143, of the nature of a micro-ammeter, which serves as the balance indicator responsive to direct current furnished by the amplifier 136 directly or as translated by computer T, is biased to read zero before the evaporation starts and is set to full scale sensitivity by a variable shunting resistor as the first quarter wave reflection peak is passed, indicating the range at hand. Thereafter the meter remains calibrated for the material that is being evaporated. An initial high index coating is applied, the beams are balanced, and the instrument calibrated before the next layer, of different material, is coated. Any deviation from the glass reflection in either sense is indicated as an unbalanced condition by the instrument. Thus when going from extremely high to extremley low index materials it is merely necessary to reverse the polarity of the instrument. The calibrating curve corresponds in either case to that indicated at I of Fig. 6. Unequal distances from the crucible, of monitor and specimen surfaces respectively, are compensated by calibration of the indicating meter included in curve I.

*The crucible assembly*

A practical embodiment of the evaporating equipment the general function of which is outlined above with reference to Fig. 1, will now be described in detail with additional reference to Figs. 15 to 23.

The evaporator table 52 supports within cell 51 three columns 201, each of which has attached thereto by means of set screws or similar means plate supporting collars 205, 206 and 207. The table 52 also carries a bearing 57 which constitutes a high vacuum seal for the control shaft 56 which extends through the table and carries a control level 215. An insulating flange 212 is fastened to the upper end of shaft 56 and supports the turret base 55. The lever 215 rides on a bar (not shown) with two notches corresponding to register of a respective crucible 61 or 62, with aperture 102 of plate 101 (Figs. 1 to 19).

The table 52 has three insulating bushings 91 (Figs. 1 and 15) which supply low voltage high current power to the evaporating apparatus. A high voltage terminal and bushing 219 leads through the table 52, for purposes to be described bleow.

The turret base 55 (Figs. 1, 15, 19, 20 and 23) carries three electrode posts 221, 222 and 223 which are at 225, 226, 227 connected with heavy flexible cables to the lead-in bushings 91 as schematically indicated at 85, 87, 88 of Fig. 1, care being taken that the cables will not touch any metal part when the table is rotated. Electrode clamps 231, 232, 233 and 234 (Fig. 23) support filaments 81, 82. The turret bearing and the electrode posts are provided with suitable heat insulators and a baffle plate or partition 241 (Fig. 23) is mounted on post 222, to separate the filaments and to shield each crucible from receiving vapor from the other.

In accordance with the invention, two filaments are used to avoid carrying material D1, D1 from one crucible to the other if only one filament serving both crucibles were used. Filaments made of 0.05" wire were found satisfactory. If, as in the embodiment referred to herein throughout, one material is zinc sulphide and the other lead fluoride, the filament for the former is made of molybdenum, and that for the latter of platinum-iridium alloy. It is important that the platinum filament does not touch its lead fluoride crucible since the crucible wall might then become red hot and a reaction between the crucible material and the fluoride promoted. This can cause impure vapor which might contaminate the coatings.

As shown in Figs. 21 and 22, the filaments are wound in basket shape accommodating the crucible curvature for the purpose of providing uniform and close contact with the powdered dielectric material before and during evaporation from the crucibles. The filaments are wound symmetrically which is quite important because unsymmetrical filaments cause uneven evaporation over the surface of the crucible and hence uneven deposition.

Two crucibles 61, 62 (Figs. 1, 15, 19, 20 and 23) are mounted on spring supports 63, 64 of the following construction. Sockets 243, 244 are screwed to the turret base 55 as shown in Fig. 23. Sleeves 245, 246 slide on the sockets, with springs 248 tending to raise the sleeves. The springs are fairly soft, so that they exert a force just strong enough to retain the filament baskets 81, 82 in contact with the evaporation material D1, D2 within the crucibles. Sleeves 245, 246 are provided with holes 249 to prevent any dash pot action of this construction and to promote perfect evacuation and carry holders 245.1, 245.2 for the crucibles 61, 62.

The filaments bend easily when hot which has to be taken into consideration by keeping the filament temperature as low as possible and by selecting the springs 248 just soft enough not only to maintain the abovementioned contact with the powder D, during evaporation, but also to keep the filament stationary with regard to its supports. Generally speaking, this construction provides particularly uniform layers due to more uniform evaporation of the dielectric material and of that material only, and due to maintenance of a constant distance between the evaporating surface of the dielectric material and the specimen surface to be coated.

A shield 101 (Figs. 1, 15, 16 and 19) is supported on collars 205 by means of pins 209. This shield 101 has a window 102 at the approximate center of the bell jar 51. By means of the lever 215 and the shaft 56, platform 55 can be rotated on bearing 57 so that one or the other crucible can be brought under the aperture 102 and kept there by means of the previously mentioned notches of a bar in contact with handle 215. The flexible cables 225, 226 and 227 permit this movement.

*The specimen and monitor assembly*

Collars 296 of columns 201 (Fig. 15) support a mask mounting ring 251 which, by means of three rollers 252 mounted on ring 251 with brackets 253 rotatably support the mask 120 mentioned above with reference to Fig. 1. The mask 120 is an attenuating device designed to intercept, by virtue of its peculiar shape as shown in Figs. 17 and 18, a portion of the evaporated dielectric material mainly at the center with decreased attenuation towards the edges resulting in a plane of uniform deposition over a comparatively large area. It is easy by way of a few trials to arrive at an attenuator shape which locates the plane of uniform deposition at the effective plane of deposition as essentially defined by platform A. The attenuating mask 120 is driven at substantially uniform speed by means of a motor 131 (Figs. 1 and 17) magnetic clutch 126, gear 125 and roller 252.1.

Apart from considerations of wedge coating, it is essential each layer be uniform over the surface of each specimen as well as the surface of the monitor plate M. Without the attenuating mask 120 the center of platform A would have coatings of maximum thickness falling off rapidly towards the edges. This effect can be utilized to coat wedge shaped layers, with the aid of attenuation masks of appropriate shape. However the herein described technique of wedge control by means of specimen tilting was found to be more expedient for purposes of the present practical embodiment.

The platform A is supported on collars 207 of columns 201 (Fig. 15) and carries the following components.

As shown in Figs. 15 and 16, a monitor mask $Am$ is screwed to the lower side of platform A and has an aperture $m$ which is aligned with the window 119 of the platform. This platform further supports a shaft 105 resting with a thrust collar 261 (Fig. 16) on a thrust washer 262. The monitor plate M is carried between a flange 263 of the shaft 105 and a holding plate 264 screwed thereto at 265, so that the plate M can be easily exchanged. The shaft 105 has at its upper end a bevel gear 115 (Fig. 15) which transmits the position of a control knob 126 with pointer 126.1 (Figs. 1 and 15), through shafts 111.1 and 111.2, magnetic clutch 124, and bearing 127. A simple scale on a plate 126.2 fixed to the evaporator frame is marked to correspond to consecutive positions of monitor plate M so that the latter can be brought into proper locations for receiving consecutive monitoring coatings.

The platform A further supports, at two windows $s1$ and $s2$ (Figs. 1, 17 and 24 to 26), specimen support frames constructed as follows.

Each frame has two side plates 271.1 and 271.2 with projections 272 reaching downwardly into windows $s$ of platform A (Fig. 26). These plates are screwed to frame bars 273.1 and 273.2, flush with the roots of the abovementioned extensions 272 and the edges of windows $s$. Brazed or otherwise fastened to one side plate, for example 271.1, are two blocks 275 and 276 which have threaded bores for adjustable stop screws $sr$ and $sb$ with lock nuts 278.1 and 278.2. The side plates 271 rockingly support, on pivot pins 281.1 and 281.2, specimen supports proper numbered 270. Each of these consists of a base plate 283 with windows $s11$ and $s12$, and two specimen supporting strips 285.1 and 285.2 resting between lips 286.1, 286.2 of plate 283. As shown in Fig. 25, these strips are chamfered to fit the chamfered edges of specimen bodies S, in this example prism components as discussed with reference to Figs. 3 and 7 to 12. The specimen supporting strips are adjustably fastened to the plate 283 by means of slots 286 and screws 287. One of the side plates, in this instance 271.2 has opposite block 276 an extension 288 with a curved slot 291 (Figs. 24, 26) that accommodates a screw 292 engaged in a threaded hole of an ear 293 of plate 283. By tightening screw 292, plate 283 can be arrested relatively to the supporting frame proper, after having been swung about pivots 281. The stop screws $sr$ and $sb$ permit predetermination of vapor depositing angles, corresponding to wedge gradients. One angle is determined by screw $sr$, and the larger one by $sb$. It will be understood that either one or the other of these stop screws is out of contact with the supporting frame, after the latter has been rotated into contact with the other and arrested by means of clamp screw 291.

*Operation*

The method according to the invention as carried out with apparatus according to the invention herein described as an embodiment thereof, will now be shortly recapitulated mainly with a view to practical features of manipulation; the theoretical explanations of features such as calibration, translation, photometry and wedge coating will not be repeated.

The coating materials D1, D2 are placed in respective crucibles 61, 62, removed from their holders 245. The springs 248 and the dimensions of crucible supports 63, 64 are so selected that the filaments 81, 82 will just about touch the bottom of the crucibles with the springs fully relaxed. The material to be evaporated is packed into the crucibles and tamped down as tightly as possible. The crucibles are then placed into their holders with sleeves 245, 246, pushed down, whereupon they are released and the springs 248 permitted gently to press the top of the material against the filament baskets. The shield 101 is checked for exact alignment with the crucibles as positioned by means of lever 215.

The shielding aperture 102 serves the double purpose of protecting the cold crucible from being contaminated by material evaporating from the hot one and of providing an instantaneous cutoff feature. During evaporation the flat filament basket sinks slowly down into the heated material as the pressure of the springs gradually raises the crucible with the material, keeping it in contact with the filament. This provides a very smooth uniform rate of evaporation and other advantages which cannot be obtained by means of the metal boats conventionally used for similar purposes. Furthermore, the temperature of the filament can be kept lower than in the case of a gap between heater and material, just sufficient to maintain proper evaporation. This lower temperature has the above discussed advantages, including that of providing a constant distance between specimen and evaporating surface.

Crucibles are preferably used in order to avoid high temperature reactions with the container regardless of the material. The containers should be able to hold large enough quantities of evaporation materials to coat a considerable number of layers without recharging, and cross contamination between the two materials should be with safety avoided. The present construction fulfills these requirements and in addition permits the heating of both materials in the same position, thus avoiding any differences between the thickness distribution of two successive layers. Furthermore this construction does not produce any directional effect which could cause unsymmetrical departure from the cosine law of thickness distribution, which cannot be corrected by a rotating attenuator disk such as 120, which can only even out a symmetrical cosine distribution. Still further the present construction provides the extremely uniform evaporation rate which is particularly important in plotting the calibration curve for the material in question such as illustrated in Fig. 6, and it also permits a constant evaporation rate, maintained until the material is exhausted. Finally, the apparatus according to the invention permits the vapor stream freely to reach the specimen plane and to be cut off instantaneously when the layer being coated reaches the correct thickness, regardless of thermal lag in the heated material.

The specimen to be coated such as prisms S, are placed with their holders 270 into apertures s. It will be evident that four faces can be coated simultaneously with the above described apparatus, but that of course a greater or smaller number can be coated in this manner. The appropriate wedge angle is set by means of set screws sr, sb, as above described.

A clean monitor plate with or without the above described auxiliary or compensating coating is inserted as described with reference to Fig. 16, by mounting it on its rotatable support 263. Referring to Figs. 16 and 17, it will be noted that the monitor plate is laterally accessible which facilitates its manipulation and exchange. The attenuating mask 120 is placed on its rollers 252.

Bell jar 51 is now lowered into place and exhausted to the conventional pressure, below $0.1\mu$ of mercury. The motor 131 is started driving the mask 120 as above described at the constant speed for which the entire system is calibrated. The optical system is adjusted and balanced as above described.

The glass surfaces about to be coated are then given a final cleaning in vacuo, and the tank is gassed out by means of a high voltage discharge between the mask support 251 and the specimen platform A. As shown in Fig. 15, the platform A is grounded through columns 201, and the mask support 251 is insulated and with a wire connected to the above described high tension terminal 219.

Evaporation is now started by closing either switch 97 or 98 (Fig. 1) to supply the filament for the first coating with the appropriately large current heating it to evaporation temperature depending on the material, but not higher in order to avoid deformation which would affect the distance between specimen and evaporating surface.

When the recording meter 141 indicates that the layer has reached the proper thickness the filament current is shut off and the hot crucible is immediately rotated from the evaporating position, underneath shield 101. Thus during the period while the crucible is cooling down any evaporating material is coated on the bottom of the shield and cannot reach the specimen plane. This provides in effect for instantly turning on and off the vapor stream in the manner of a switch. This feature is very important in making multilayer reflectors, since accurate monitoring of the layer thickness as herein described is possible only if the amount of material evaporated can be precisely controlled.

The above procedure is repeated with the other and then again with the first crucible and so forth until the required number of layers has been built up. The crucibles ordinarily hold material enough for coating the requisite number of layers.

After coating each layer, the monitor plate M is rotated by means of knob 126 to bring a fresh, uncoated sector into position. It will now be evident that the final apperance of the monitor plate is quite different from that of the specimen; the latter has all layers superimposed whereas the monitor plate carries them side by side. This permits checking for errors, it being easily possible to see where deviation has occurred. It will be understood that the monitor plate should preferably be large enough to accommodate a number of sectors equal to the number of layers to be coated, unless the number of layers is so large that the crucibles cannot hold enough material to coat them all. In other words the capacity of the crucibles, the number of layers to be coated in any particular case, and the size of the monitor plate can be correlated to allow a continuous operation without, if possible, the necessity of opening the vacuum tank to replace the monitor plate or to refill the crucibles. If the specimen should require more layers than either monitor plate or crucibles accommodate, then a new monitor plate is inserted and the crucibles recharged at the same time.

The above-mentioned registering of the meter readings on an automatic recorder is advantageous because it is often desirable to stop the evaporation at an exact maximum or minimum of the control function as shown in Figs. 1 and 6. Without continuous recording it is almost impossible to avoid the slight over shooting of a layer in order to be sure that an inflection point has actually been reached. On the recorder however trends and rates of change which cannot be determined from a simple meter become directly visible, giving the operator information of an additional type, from which to predict the progress of the procedure.

After the specimen has been provided with the requisite number of layers, the vacuum is broken and the specimen removed.

It should be understood that the present disclosure is for the purpose of illustration only and that this invention includes all modifications and equivalents which fall within the scope of the appended claims.

We claim:

1. Apparatus for the controlled evaporation coating of superimposed layers of a plurality of optical media, comprising: two containers for the respective media, means for selectively heating one of said media in said containers, means for supporting above said containers a specimen to be coated, an apertured shield disposed above said containers, and means for selectively moving said containers and heating means to bring one of the containers below said aperture while the other container is shielded from said specimen.

2. Apparatus according to claim 1 further comprising a specimen holder tiltably fastened to said specimen supporting means, and stop means for predetermining a tilting angle of said holder.

3. Apparatus for the controlled evaporation coating of superimposed layers of a plurality of optical media, comprising: two containers for the respective media; means for selectively heating one of said media in said containers; means for supporting above said containers a specimen to be coated; means for rotatably supporting a monitor plate at approximately the distance of a specimen surface from the heated medium; an attenuating mask having an aperture rotatably arranged between said containers and said supporting means; means for rotating said mask to control layer deposit thickness distribution; aperture means between said mask and said monitor plate for exposing only a portion of the plate; and means for rotating said monitor plate supporting means so as to permit exposure of different portions thereof through said aperture means to said heated materials.

4. Apparatus according to claim 3 further comprising a source for illuminating said plate and means for measuring light from said source as reflected from a surface of the plate.

5. Apparatus for the controlled evaporation coating of layers of optical medium comprising: a container for said medium; means for selectively heating said medium in said container; and a platform for supporting a specimen to be coated adjacent said container, said supporting means including a frame mounted thereon for rotation about an axis which intersects substantially a line from said frame to said container, and means for determining and fixating a predetermined tilting angle of said frame relatively to said line.

6. Apparatus for coating superimposed fractional wave length interference layers on an optical device which defines an operational ray path of predetermined geometry, comprising: means for simultaneously depositing layers of interference material in superimposition on a surface of said device and in separate control layers on different areas of a monitor surface; means for directing, during said depositing of corresponding specimen and control layers, a light beam of predetermined measuring wave length towards said monitoring surface for attenuation thereon as supervisory signal in a measuring ray path the geometry of which is unlike said operational geometry; quantitatively light sensitive detecting apparatus arranged for receiving said attenuated beam; and an indicator adapted for reading the intensity of said signal in terms of values of light of a control wave length, reflected from said control layers.

7. Apparatus according to claim 6 wherein said measuring wavelength is in the short wavelength visible and ultraviolet spectral range.

8. Apparatus according to claim 6 wherein said light directing means directs said light beam towards said monitor surface with substantially normal incidence.

9. Apparatus for coating superimposed fractional wavelength interference layers on an optical device which defines an operational ray of predetermined operational wavelength in an operational path of predetermined geometry, comprising: means for simultaneously depositing layers of interference material in superimposition on a surface of said device and in separate control layers on different areas of a monitor surface; means for emitting a light beam of predetermined measuring wavelength and for directing it, during said depositing of corresponding specimen and control layers, towards said monitoring surface for attenuation thereon as supervisory signal in a measuring ray path the geometry of which is unlike said operational geometry; quantitatively light sensitive detecting apparatus arranged for receiving said attenuated beam; translating means for the conversion of said supervisory signal, as attenuated by the progressively increasing thickness of said control layer, into an output signal in terms of attenuation of said operational ray in said operational path by said layer on said surface of said optical device; and an indicator for reading said output signal in said terms of said operational ray.

10. Apparatus according to claim 9 wherein said light emitting and directing means emits light in the short wavelength region of the visible and ultraviolet spectral range.

11. Apparatus according to claim 9 wherein said light emitting and directing means directs said measuring light beam towards said monitor surface with substantially normal incidence.

References Cited in the file of this patent

UNITED STATES PATENTS

| | | |
|---|---|---|
| 2,057,353 | Whittemore | Oct. 13, 1936 |
| 2,338,234 | Dimmick | Jan. 4, 1944 |
| 2,426,939 | Libman | Sept. 2, 1947 |
| 2,472,605 | McRae et al. | June 7, 1949 |
| 2,545,576 | Godley | Mar. 20, 1951 |